(12) United States Patent
Yoshitake

(10) Patent No.: US 11,449,552 B2
(45) Date of Patent: Sep. 20, 2022

(54) SEARCH SYSTEM AND SEARCH METHOD

(71) Applicant: NATIONAL INSTITUTE FOR MATERIALS SCIENCE, Tsukuba (JP)

(72) Inventor: Michiko Yoshitake, Tsukuba (JP)

(73) Assignee: NATIONAL INSTITUTE FOR MATERIALS SCIENCE, Ibaraki (JP)

( * ) Notice: Subject to any disclaimer, the term of this patent is extended or adjusted under 35 U.S.C. 154(b) by 0 days.

(21) Appl. No.: 17/261,172

(22) PCT Filed: Jul. 18, 2019

(86) PCT No.: PCT/JP2019/028188
§ 371 (c)(1),
(2) Date: Jan. 18, 2021

(87) PCT Pub. No.: WO2020/026822
PCT Pub. Date: Feb. 6, 2020

(65) Prior Publication Data
US 2021/0279281 A1   Sep. 9, 2021

(30) Foreign Application Priority Data
Aug. 1, 2018 (JP) .............................. JP2018-144907

(51) Int. Cl.
*G06F 16/00* (2019.01)
*G06F 16/901* (2019.01)
(Continued)

(52) U.S. Cl.
CPC ........ *G06F 16/9024* (2019.01); *G06F 16/288* (2019.01); *G06F 16/9035* (2019.01);
(Continued)

(58) Field of Classification Search
CPC .................................................. G06F 16/288
See application file for complete search history.

(56) References Cited

U.S. PATENT DOCUMENTS

2013/0080476 A1   3/2013   Tokai
2015/0254309 A1   9/2015   Sekiguchi et al.
(Continued)

FOREIGN PATENT DOCUMENTS

| JP | 2004-220227 A | 8/2004 |
| JP | 2007-018444 A | 1/2007 |
| WO | WO 2017/221444 A1 | 12/2017 |

OTHER PUBLICATIONS

Michiko Yoshitake et al., "Materials Curations™: Formation Enthalpy vs. Materials Properties", Proceedings of the 65th Spring Meeting of the Japan Society of Applied Physics, 18a-F202-1, 2018.
(Continued)

*Primary Examiner* — Ajith Jacob
(74) *Attorney, Agent, or Firm* — SGPatents PLLC

(57) ABSTRACT

Provided is a search system that executes a path search in a graph (a material property relationship graph) in which each material property parameter of a material property parameter pair whose relationship is already known is node and a relationship between the material property parameters is an edge, the search method capable of executing various search methods and various search systems. The search system includes a graph searcher that executes a path search in a material property relationship graph, and a search condition extractor that supplies a plurality of search items to the graph searcher based on search conditions to be input. The search condition extractor extracts, based on the input search conditions, a start point or an end point or both a start point and an end point, and a third node different from the start point and the end point or a path length condition and supplies the extracted items to the graph searcher as a search item. The graph searcher, depending on the supplied search items, searches the material property relationship graph, and out-
(Continued)

puts a path or a subgraph that matches the search condition as a search result.

14 Claims, 10 Drawing Sheets

(51) Int. Cl.
    *G06F 16/903*     (2019.01)
    *G06F 16/9038*     (2019.01)
    *G06F 16/9032*     (2019.01)
    *G06F 16/9035*     (2019.01)
    *G06F 16/28*     (2019.01)

(52) U.S. Cl.
    CPC .... *G06F 16/9038* (2019.01); *G06F 16/90328* (2019.01); *G06F 16/90335* (2019.01)

(56) References Cited

U.S. PATENT DOCUMENTS

2019/0139279 A1*   5/2019   Yoshitake ........... G06F 16/9024
2020/0387547 A1*  12/2020   Yoshitake ........... G06F 16/9024

OTHER PUBLICATIONS

Michiko Yoshitake, "Utilization of Information on Materials in Multi-Dimensional", Journal of Surface Analysis vol. 25 No. 1 (2018) pp. 2-8.
Michiko Yoshitake et al., "System for Searching Relationship among Physical Properties for Materials Curation™", Surface and Vacuum vol. 61, No. 4, pp. 200-205, 2018.
Michiko Yoshitake, "Materials Curations Material Design by Multi-Disciplinary Use of Material Information", Journal of the Japan Institute of Metals and Materials, vol. 80, No. 10, Sep. 9, 2016, pp. 603-611.
International Search Report from International Patent Application No. PCT/JP2019/028188, dated Oct. 15, 2019.
Extended European Search Report dated Jun. 25, 2021, in European Patent Application No. 19843733.7.

* cited by examiner

FIG. 2

| mode | query ("search path(s) ...") | output of the search operation |
|---|---|---|
| 1 | from A to B | paths of start point A → end point B |
| 2 | from A to B including D[*1)] in the paths | paths of start point A → end point B via D (inclusive path) |
| 3 | from A to B excluding D[*1)] in the paths | paths of start point A → end point B not via D (exclusive path) |
| 4 | from A to B AND/NOT/OR A to D[*1)] | common path / uncommon path / a sum graph between paths of A → B and paths of A → D |
| 5 | from A to B AND/NOT/OR D[*1)] to B | common path / uncommon path / a sum graph between paths of A → B and paths of D → B |
| 6 | from A to B OR B to D[*1)] | sum graph of paths of A → B and paths of B → D |
| 7 | from A to B within n paths | paths of start point A → end point B having length $\leq$ n |
| 8 | from A to B OR around B within m | sum graph of paths of A → B and paths having length $\leq$ m around B |
| 9 | from A within m | subgraph of paths having length $\leq$ m and start point A |
| 10 | to B within m | subgraph of paths having length $\leq$ m and endpoint B |
| 11 | from A within m1-m2 paths | subgraph of paths having m1 $\leq$ length $\leq$ m2 and start point A |
| 12 | to B within m1-m2 paths | subgraph of paths having m1 $\leq$ length $\leq$ m2 and end point B |

*1): "D" maybe "D1 and D2 ···" or "D1 or D2 ···".

FIG. 3

| No. | display option | display operation |
|---|---|---|
| 1 | all paths | display all paths |
| 2 | shortest path | display shortest path |
| 3 | within p paths | display paths having length $\leq$ p |
| 4 | within p1-p2 paths | display paths having p1 $\leq$ length $\leq$ p2 |
| 5 | beyond p paths | display paths having p $\leq$ length |
| 6 | difference with [opt. No.] | display difference between current search result and specified display option [opt. No.] |
| 7 | similar paths | display another search that shares many paths with search results |
| 8 | similar graph | display another search with graph similar to search result |
| 9 | common paths with from A to X | display common paths between search result and start point A and end point X |
| 10 | uncommon paths with from A to X | display uncommon paths between search result and start point A and end point X |
| 11 | common paths with from Y to B | display common paths between search result and start point Y and end point B |
| 12 | uncommon paths with from Y to B | display uncommon paths between search result and start point Y and end point B |
| 13 | from the end node to D | additionally display paths from end point to node D |
| 14 | around the end node within m paths | additionally display paths around end point within path length m |

FIG. 8

| CAUSE-SIDE MATERIAL PROPERTY PARAMETER | RESULT-SIDE MATERIAL PROPERTY PARAMETER | RELATIONSHIP | RELIABILITY | CONDITION |
|---|---|---|---|---|
| A | B | positive correlation | 1 | |
| A | C | proportional | 0.2 | |
| | | | | |
| | | | | |
| | | | | |
| | | | | |
| | | | | |
| | | | | |
| | | | | |

FIG. 9

| MATERIAL PROPERTY (NODE) | NUMBER OF EDGES | | MEASUR-ABILITY | DATA VOLUME OF DATABASE | MATERIAL PROPERTY VALUE |
| | OUTGOING EDGES | ENTERING EDGES | | | |
|---|---|---|---|---|---|
| A | | | | | |
| B | | | | | |
| C | | | | | |
| D | | | | | |
| E | | | | | |
| F | | | | | |
| G | | | | | |
| H | | | | | |
| K | | | | | |
| L | | | | | |
| M | | | | | |
| N | | | | | |

SEARCH SYSTEM AND SEARCH METHOD

TECHNICAL FIELD

The present invention relates to a search system and a search method using a database, and more particularly, the invention is capable of being suitably used for a path search in graphs representing relationships among material property parameters.

BACKGROUND ART

An objective of prediction and design in material research is to identify materials having target characteristics. A method that has been widely used to achieve this objective is to identify a material having target characteristics from a condition-characteristic chart. The method is: observing a change in a characteristic upon changing one specific condition among a plurality of conditions to create a chart, and interpolating or extrapolating the chart to obtain a condition under which the target characteristic is achieved, thereby identifying a material that matches the target characteristics. The term "chart" herein is synonymous with "graph," like a line graph. However, the term "chart" is hereafter used to distinguish from a "graph" consisting of nodes and edges, which will be described later.

Here, a change in characteristics upon changing one specific condition among a plurality of conditions is often obtained experimentally. This is because, even if many literatures are searched, it is difficult to obtain a large amount of data having the same conditions except for the above specified condition.

PTL 1 discloses a search system capable of objectively searching for constituent material information of a new material having desired characteristics.

The search system disclosed in PTL 1 includes a database containing a plurality of pieces of material property parameter information for each of a plurality of (many) materials. Here, for some materials, material property parameters to which real data has not been provided may be contained in the database. Two-dimensional space or three or more-dimensional space is created with a material property parameter to be searched for being one axis and some of the other material property parameters being the other axis (or axes), and each of the materials in the database is mapped in the space. At this time, material property parameters not having real data are interpolated by virtual data predicted by multivariate analysis, calculation based on a predetermined logical expression, the first-principles calculation, etc. In a search map obtained by mapping the real data and the virtual data, a material having desired characteristics is to be specified based on a predefined rule.

PTL 2 discloses a search system and a search method capable of searching for an unknown combination of material property parameters having a significant relationship based on an already known relationship from among a plurality of arbitrary combinations of material property parameters. This search system includes a database, a graph generator and a graph searcher, and is configured as follows. The database stores a plurality of pairs of material property parameters having mutual relationships, and the graph generator generates a graph in which a plurality of material property parameters stored in the database are nodes and in between the nodes corresponding to the material property parameter pairs stored to have mutual relationship are edges. The graph searcher executes a path search in the graph generated by the graph generator under a provided search condition, and outputs a search result.

PRIOR ART DOCUMENT

Patent Document

PTL 1: Japanese Patent Application Laid-Open No. 2007-18444

PTL 2: International Publication No. WO 2017/221444

SUMMARY OF THE INVENTION

Problems to be Solved by the Invention

The inventor has studied PTL 1 and PTL 2, and found new problems as follows.

In the technique described in PTL 1, relationships among a plurality of material property parameters used to predict virtual data are limited to those already known.

The inventor of the present application has found the following: when search is executed across a plurality of technical fields as described above, the number of material property parameters becomes very large and, therefore, it is possible to extract an unknown combination of material property parameters having a significant relationship based on already known relationships from among a plurality of arbitrary combinations of material property parameters. The inventor of the present application proposed the search system described in PTL 2 as a solution to PTL 1.

According to the search system and the search method described in PTL 2, a user can conduct a search across all fields including those having less close relationships. Therefore, an unknown combination of material property parameters having a significant relationship can be extracted.

A user who performs such a search can select optimized materials or optimize the manufacturing process, such as controlling one of two material property parameters having a significant relationship based on the extracted path, and adjusting the other to the desired material property value. Here, the path that defines the relationship between the two material property parameters often includes another or other material properties.

The inventor of the present application has found that the user needs a more complicated path search in order to select the optimum material and optimize the manufacturing process.

For example, when controlling one material property parameter (start point) for optimization of the other (end point) in order to select the optimum material or optimize the manufacturing process, the user may sometimes not want to change material property values of certain other material properties. Here, in the path extracted by the search system disclosed in PTL 2, nodes corresponding to a plurality of material property parameters may be included between the start point and the end point. When the material property parameter of the start point is changed, there is a high possibility that not only the material property parameter of the end point but the material property parameters corresponding to the nodes between the start point and the end point are also changed.

Further, for example, when one material property parameter (start point) is controlled for optimization of the other (end point), it may be desired to optimize other material property parameters as well.

The inventor of the present application has found that a path search of a graph focusing only on the start point and the end point is not sufficient in order to meet such diverse needs.

The inventor of the present application had invented a search method that enables prioritization in the path search of a graph by giving various weights to the relationships between material property parameters and providing them with attributes of the corresponding edges, and filed as Application No. 2017-037387.

However, the inventor has found that giving various weights to the relationships between material property parameters as edge attributes is not sufficient to meet all of the above-described diverse needs.

An objective of the present invention is to provide various search methods and a search system capable of executing various search methods in searching for a relationship among material property parameters.

Means for solving such a problem will be described below. Other problems and novel features will become obvious from the description of the specification and the accompanying drawings.

Means for Solving the Problem

According to one embodiment, the following is provided.

The search system includes a graph searcher that executes a path search in a material property relationship graph, and a search condition extractor that supplies a plurality of search condition items to the graph searcher based on input search conditions.

The material property relationship graph is composed of a plurality of nodes each corresponding to each of a plurality of material property parameters and edges each connecting a pair of nodes corresponding to a plurality of material property parameter pairs having mutual relationships.

The search condition extractor extracts, based on the input search conditions, a start point or an end point or both a start point and an end point, and a third node different from the start point and the end point or a path length condition and supplies the extracted items to the graph searcher as search condition items. The graph searcher, depending on the supplied search items, searches the material property relationship graph, and outputs a path or a subgraph that matches the search condition as a search result.

The third node may be a single node or a plurality of nodes. As the path length condition, various conditions such as within a predetermined range, equal to or longer than a predetermined path length, and the like may be specified in addition to within predetermined path length. The path length referred to herein may be defined by the number of edges to be passed through, or any other definition for calculating the path length may be adopted. For example, the path length may be defined by assigning quantified attributes related to material property relationships to each edge and calculating the total of attribute values along the path.

Effect of the Invention

The effect to be obtained by the above embodiment will be briefly described below.

That is, it is possible to provide various search methods and a search system capable of executing various search methods in searching for a relationship among material property parameters.

BRIEF DESCRIPTION OF THE DRAWINGS

FIG. 2 is an explanatory diagram illustrating a search mode that can be executed in the first embodiment.

FIG. 3 is an explanatory diagram illustrating display options that can be additionally specified in the first embodiment.

FIG. 8 is an explanatory diagram illustrating an example of a material property relationship database that provides attribute information to edges of a material property relationship graph 3.

FIG. 9 is an explanatory diagram illustrating an example of a material property relationship database that provides attribute information to nodes of the material property relationship graph 3.

DETAILED DESCRIPTION OF THE INVENTION

1. Outline of Embodiment

Figure 1:
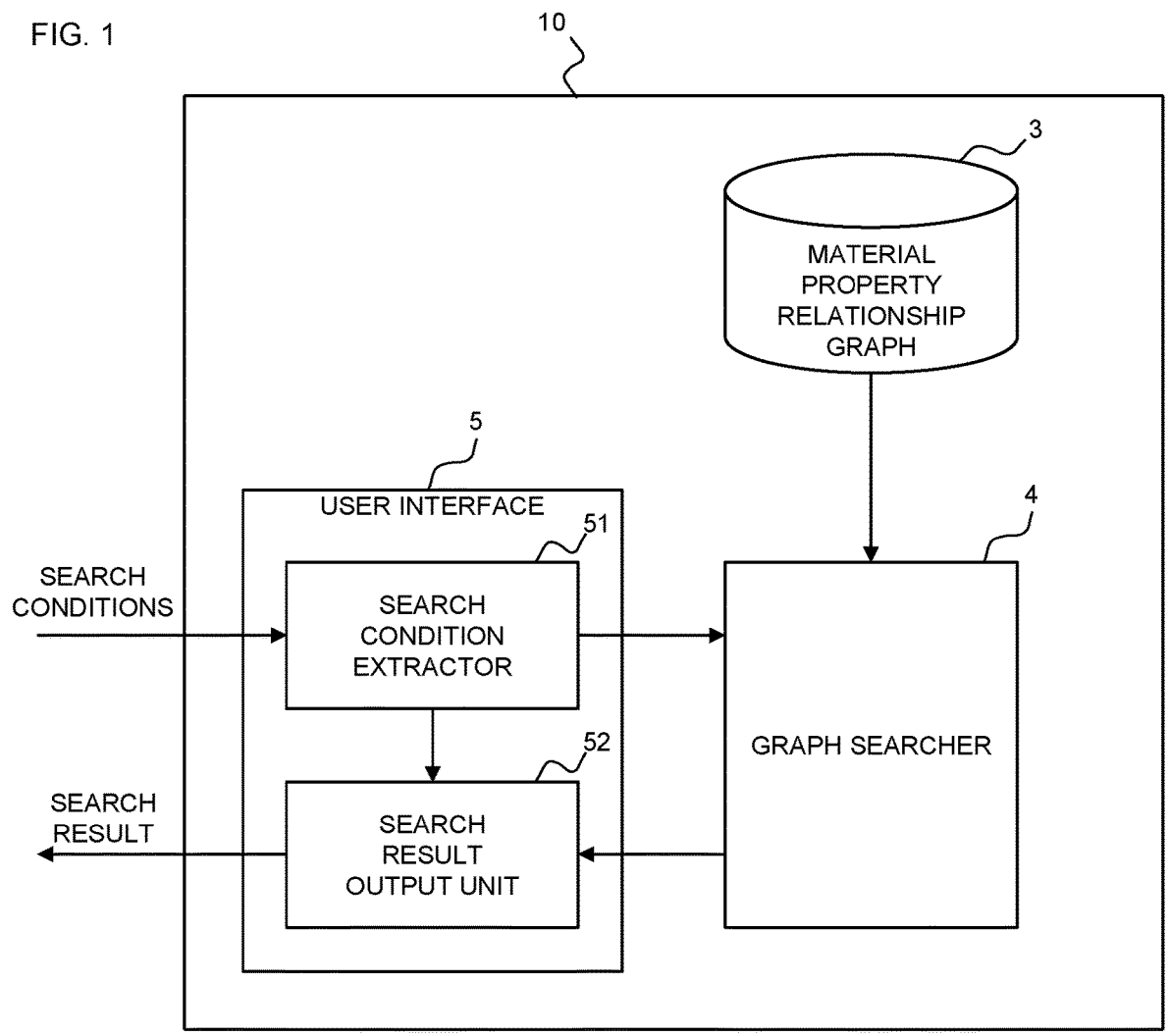
FIG. 1 is a block diagram illustrating a configuration example of a search system according to a first embodiment.

First, an outline of a typical embodiment disclosed herein will be described. Reference signs in the drawings also referenced in parentheses in the description of the outline of the typical embodiment merely exemplify those included in the concept of the components to which the reference signs are given.

[1] Search System that can Provide Various Search Methods

A typical embodiment disclosed in the present application is a search system which includes a graph searcher (4) that executes a path search in a material property relationship graph (3), and a search condition extractor (51) that supplies a plurality of search condition items to the graph searcher based on input search conditions. The search system is configured as follows (FIG. 1).

The material property relationship graph is composed of a plurality of nodes each corresponding to each of a plurality of material property parameters and edges each connecting a pair of nodes corresponding to a plurality of material property parameter pairs having mutual relationships.

The search condition extractor extracts, based on the search conditions, a start point or an end point or both a start point and an end point, and a third node different from the start point and the end point or a path length condition and supplies the extracted items to the graph searcher as search condition items. The graph searcher, depending on the supplied search condition items, searches the material property relationship graph, and outputs a path or a subgraph that matches the search condition as a search result.

Therefore, a search system capable of performing various searches can be provided.

[2] Search Modes

In [1], the graph searcher can execute at least one search mode out of the following nine search modes (modes 2 to 10 in FIG. 2), and output a result as the search result.

First search mode: when a start point, an end point, and a third node are specified, a path from the start point to the end point via the third node is searched for (mode 2, FIG. 2).

Second search mode: when a start point, an end point, and a third node are specified, a path from the start point to the end point not via the third node is searched for (mode 3, FIG. 2).

Third search mode: when a start point, an end point, and a path length condition are specified, a path that satisfies the path length condition is searched for from among the paths starting at the start point and ending at the end point (mode 7, FIG. 2).

Fourth search mode: when a start point, an end point, and a third node are specified, at least one of a common path common to a path from the start point to the end point and a path from the start point to the third node, an uncommon path uncommon to these paths, and a subgraph based on the sum of a first subgraph by a plurality of paths from the start point to the end point and a second subgraph by a plurality of paths from the start point to the third node (mode 4, FIG. 2).

Fifth search mode: when a start point, an end point, and a third node are specified, at least one of a common path common to a path from the start point to the end point and a path from the third node to the end point, an uncommon path uncommon to these paths, and a subgraph based on the sum of the first subgraph by a plurality of paths from the start point to the end point and the third subgraph by a plurality of paths from the third node to the end point (mode 5, FIG. 2).

Sixth search mode: when a start point, an end point, and a third node are specified, a path from the end point to the third node is searched for in addition to the path from the start point to the end point (mode 6, FIG. 2).

Seventh search mode: when a start point, an end point, and a path length condition are specified, in addition to the path from the start point to the end point, a path that satisfies the path length condition with the end point as a further start point is searched for (mode 8, FIG. 2).

Eighth search mode: when a start point and a path length condition are specified, a path within a range satisfying the path length condition from the start point is searched for (mode 9, FIG. 2).

Ninth search mode: when an end point and a path length condition are specified, a path that starts from a node present within the range that satisfies the path length condition is searched for among the paths ending at the end point (mode 10, FIG. 2).

In this manner, a search system capable of executing at least one out of the selectively listed nine types of searches can be provided.

The third node may be a single node or a plurality of nodes. If the third node is a plurality of nodes, the user specifies whether the nodes are to be processed under a logical product (AND condition) or a logical sum (OR condition). For example, when a plurality of nodes are specified with the AND condition in the first search mode, a path passing through all of the plurality of nodes is searched for and, when the OR condition is specified, a path passing at least one of the plurality of nodes is searched for.

By making it possible to specify a plurality of nodes as the third node, it is possible to more flexibly take the search conditions intended by the user.

As the path length condition, various conditions such as within a predetermined range, equal to or longer than a predetermined path length, and the like may be specified in addition to within predetermined path length. The path length referred to herein may be defined by the number of edges to be passed through, or any other definition for calculating the path length may be adopted. For example, the path length may be defined by assigning quantified attributes related to material property relationships to each edge and calculating the total of attribute values along the path.

[3] Display Option 1

In [1], the search system further includes a search result output unit (52) (FIG. 1).

The search condition extractor extracts a display option (FIG. 3) based on the input search condition and supplies the extracted display option to the search result output unit.

The graph searcher is configured to be capable of executing at least one of the following three types of search modes and supplying the result to the search result output unit.

When a start point, an end point, and a third node are specified, a path passing through the third node is searched for from among the paths from the start point to the end point (the first search mode).

When a start point, an end point, and a third node are specified, a path not passing through the third node is searched for from among the paths from the start point to the end point (the second search mode).

When a start point, an end point, and a path length condition are specified, the path satisfying the path length condition is searched for from among the paths from the start point to the end point (the third mode).

The search result output unit outputs, as a search result, a path that matches the display option out of a plurality of paths obtained as a result of executing at least one search mode.

In this manner, it is possible to output only a certain path that matches the display option from among a plurality of paths extracted by the search, and it is possible to provide a function that helps the user find a desired path.

[4] Specific Example of Display Option 1

The display option in [3] includes at least one of the following first to sixth options.

First option: when the display option is the first option (No. 1, FIG. 3), the search result output unit outputs all the paths output from the graph searcher as search results.

Second option: when the display option is the second option (No. 2, FIG. 3), the search result output unit searches for a path having the shortest path length among the paths output from the graph searcher, and outputs the searched path as a search result.

Third option: when the display option is the third option (No. 3, FIG. 3), the search result output unit outputs a path having a path length shorter than or equal to a first predetermined value among the paths output from the graph searcher, and outputs the searched path as a search result.

Fourth option: when the display option is the fourth option (No. 4, FIG. 3), the search result output unit outputs a path having a path length equal to or longer than a second predetermined value and shorter than or equal to a third predetermined value among the paths output from the graph searcher, and outputs the searched path as a search result.

Fifth option: when the display option is the fifth option (No. 5, FIG. 3), the search result output unit outputs a path having a path length equal to or longer than a fourth predetermined value among the paths output from the graph searcher, and outputs the searched path as a search result.

Sixth option: when the display option is a sixth option (No. 6, FIG. 3), the search result output unit outputs a difference between a path output from the graph searcher and a path that should be displayed when any of the specified first to fifth options is made to act on the same search as a search result.

In this manner, it is possible to output only a certain path that matches the display option focusing on the path length from a plurality of paths extracted by the search, to encourage the user to have notice, providing a function that helps the user find a desired path.

[5] Display Option 2

In [1], the search system further includes a search result output unit (52).

The search condition extractor extracts a display option (FIG. 3) based on the input search condition and supplies the display option (FIG. 3) to the graph searcher and the search result output unit.

When the display option is a predetermined first option (No. 7, "similar paths," FIG. 3), the search system operates as follows.

When a start point and an end point are specified, the graph searcher searches for a path from the start point to the end point and outputs the result as a first search result to the search result output unit.

The search condition extractor further outputs a path from another start point different from the above start point to another end point different from the above end point, and is a path connecting the another start point and the another end point so as to include the largest number of nodes on the path included in the search result of the first search result to the search result output unit as a second search result.

The search result output unit outputs the second search result in addition to the first search result.

In this manner, a function to present another start point and another end point to a user instead of the material properties of the start point and end point of the path searched for by the user as an alternative can be provided.

[6] Display Option 3

In [1], the search system further includes a search result output unit (52).

The search condition extractor extracts a display option based on the input search conditions and supplies the extracted display option to the graph searcher and the search result output unit.

When the display option is a predetermined second option (No. 8, "similar graph," FIG. 3), the search system operates as follows.

When a start point or an end point and a path length condition are specified, the graph searcher outputs a subgraph composed of nodes within a range that satisfies the path length condition from the start point or a subgraph starting from a node within a range that satisfies the path length condition among the paths ending at the end point, to the search result output unit as a first subgraph.

The graph searcher further outputs another subgraph having the highest degree of similarity to the first subgraph to the search result output unit.

The search result output unit outputs the another subgraph in addition to the first subgraph.

In this manner, a function to present a group of material property parameters having a certain relationship with the material properties searched by the user to the user as an alternative can be provided.

[7] Search System Including Graph Generator

Figure 4:
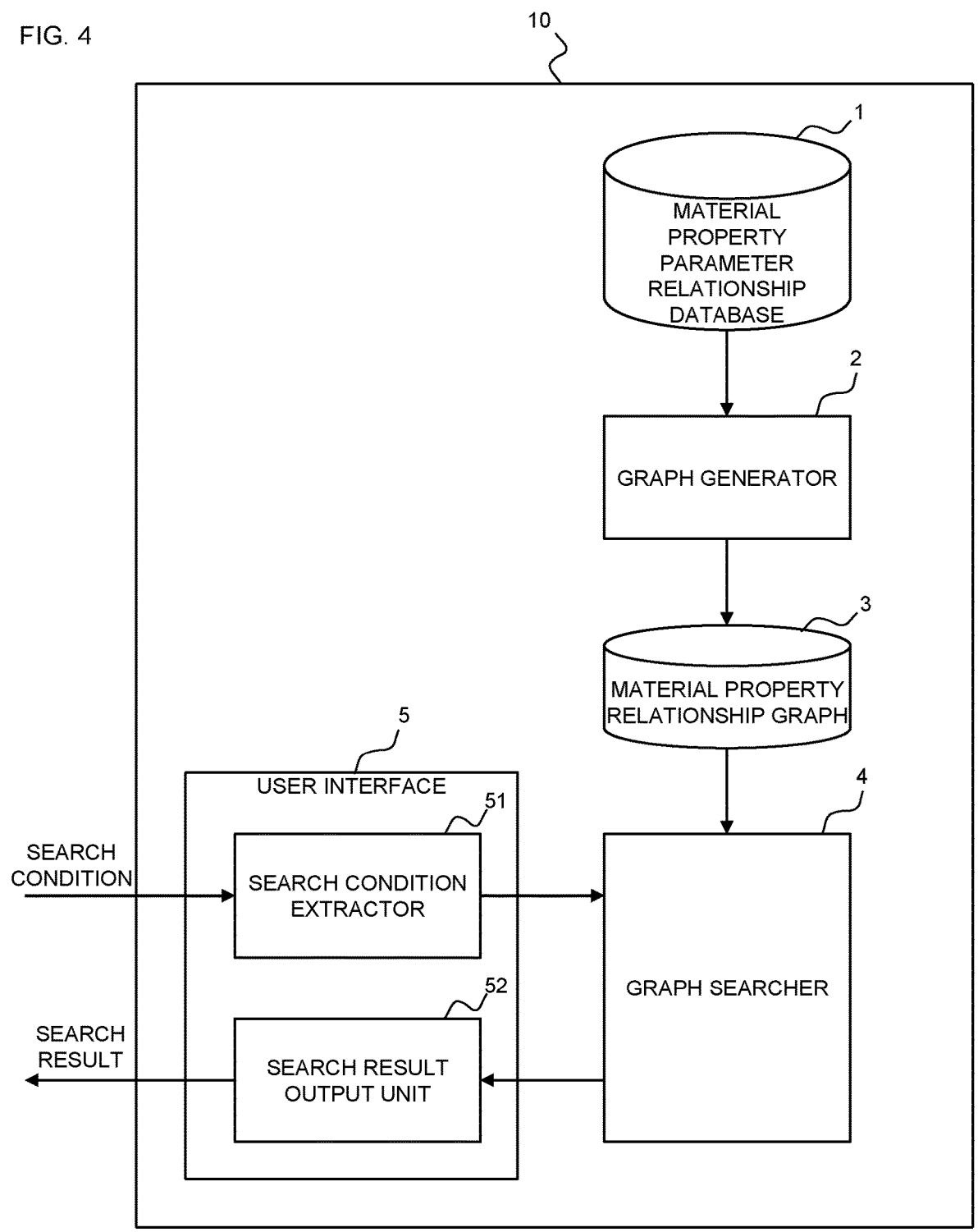
FIG. 4 is a block diagram illustrating a modified example of the search system of the first embodiment.

The search system described in any one of [1] to [6] further includes a database (1) and a graph generator (2), and is configured as follows (FIG. 4).

The database stores a plurality of parameter pairs of material property parameters having mutual relationships.

The graph generator generates a material property relationship graph in which a plurality of material property parameters included in the parameter pairs are nodes and in between the nodes corresponding to the parameter pairs are edges.

In this manner, the material property relationship graph 3 can be generated in the search system 10.

[8] Search System Capable of Providing Various Search Methods

A search method executed on a computer that can access the memory for the material property relationship graph (3) stored in the memory based on the input search condition, and is configured as follows. (FIGS. 1, 4 and 6).

The material property relationship graph is composed of a plurality of nodes each corresponding to each of a plurality of material property parameters and edges each connecting a pair of nodes corresponding to a plurality of material property parameter pairs having mutual relationships.

The search condition includes a start point or an end point or both a start point and an end point, and a third node different from the start point and the end point or a path length condition as a search condition item (FIG. 2).

Figure 6:
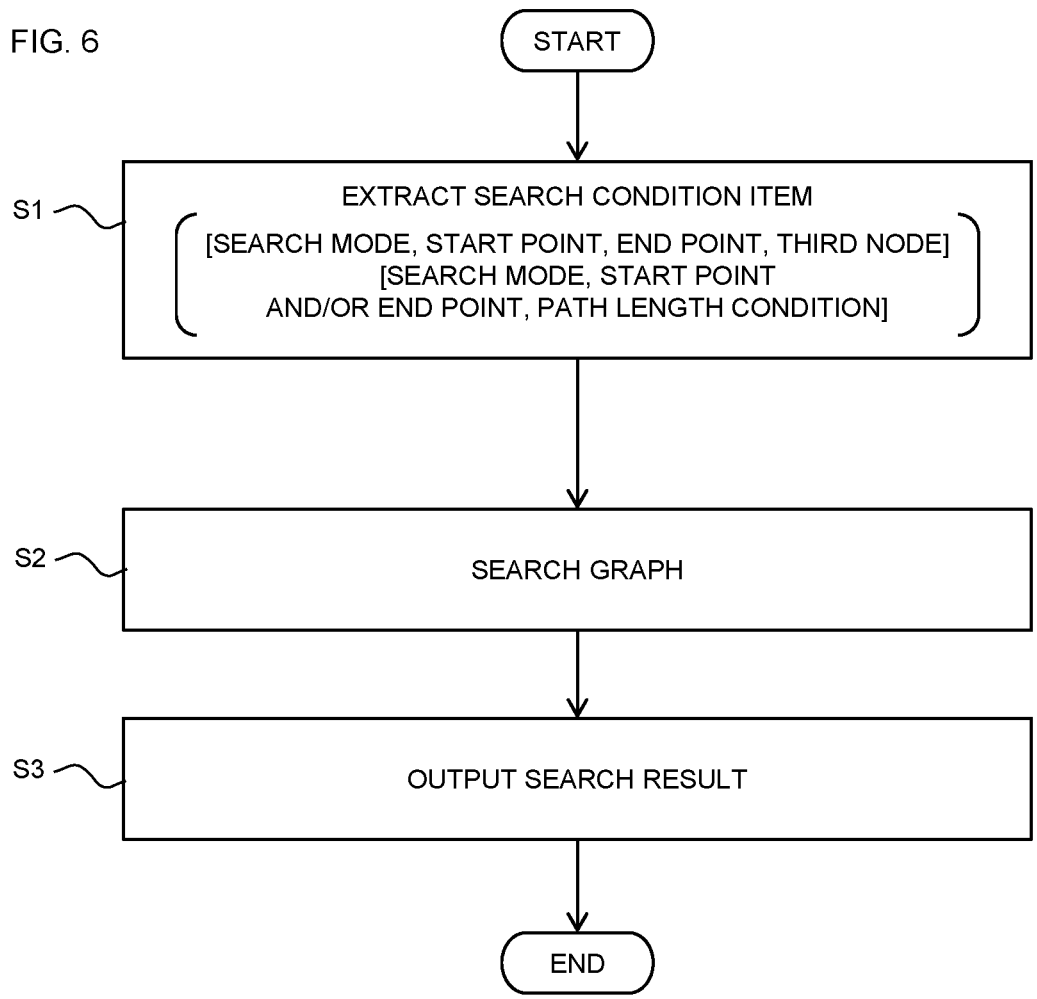
FIG. 6 is a flowchart illustrating a search method of the present invention.

The search method includes a search condition item extraction step (S1) and a graph search step (S2) (FIG. 6).

In the search condition item extraction step (S1), the search mode and the search condition item are extracted from the search condition. In the graph search step (S2), the material property relationship graph is searched according to the extracted search mode and the search condition item, and a path or a subgraph extracted by the search according to the search mode and the search condition item is output as a search result.

In this manner, various search methods for the material property relationship graph can be provided.

[9] Search Modes

The search method described in [8] is configured to be capable of executing at least one of the nine search modes (modes 2 to 10 in FIG. 2) listed below, and outputting the result as a search result.

First search mode: when the first search mode (mode 2) is extracted as the search mode and the start point, the end point, and the third node are extracted as the search condition items in the search condition item extraction step, the material property relationship graph is searched for a path passing through the third node among paths from the start point to the end point in the graph search step.

Second search mode: when the second search mode (mode 3) is extracted as the search mode and the start point, the end point, and the third node are extracted as the search condition items in the search condition item extraction step, the material property relationship graph is searched for a path not passing through the third node among paths from the start point to the end point in the graph search step.

Third search mode: when the third search mode (mode 7) is extracted as the search mode and the start point, the end point, and the path length condition are extracted as the search condition items in the search condition item extraction step, the material property relationship graph is searched for a path satisfying the path length condition among paths from the start point to the end point in the graph search step.

Fourth search mode: when the fourth search mode (mode 4) is extracted as the search mode and the start point, the end point, and the third node are extracted as the search condition items in the search condition item extraction step, the graph search step is configured to include the following steps:

a first search step of searching the material property relationship graph for a path from the start point to the end point; and a second search step of searching the material property relationship graph for a path from the start point to the third node.

The graph search step further includes a first common path generation step of finding a path common to the path searched for in the first search step and the path searched for in the second search step, a first uncommon path generation step of finding a path uncommon to these paths, or a first sum subgraph generation step of generating a subgraph by a sum of a first subgraph composed of a plurality of paths from the start point to the end point and a second subgraph composed of a plurality of paths from the start point to the third node.

Fifth search mode: when the fifth search mode (mode 5) is extracted as the search mode and the start point, the end point, and the third node are extracted as the search condition items in the search condition item extraction step, the graph search step is configured to include the following steps:

a first search step of searching the material property relationship graph for a path from the start point to the end point; and a third search step of searching the material property relationship graph for a path from the third node to the end point.

The graph search step further includes further includes a second common path generation step of finding a path common to the path searched for in the first search step and the path searched for in the third search step, a second uncommon path generation step of finding a path uncommon to these paths, or a second sum subgraph generation step of generating a subgraph by a sum of a first subgraph composed of a plurality of paths from the start point to the end point and a third subgraph composed of a plurality of paths from the third node to the end point.

Sixth search mode: when the sixth search mode (mode 6) is extracted as the search mode and the start point, the end point, and the third node are extracted as the search condition items in the search condition item extraction step, the material property relationship graph is searched for a path from the end point to the third node in addition to a path from the start point to the end point in the graph search step.

Seventh search mode: when the seventh search mode (mode 8) is extracted as the search mode and the start point, the end point, and the path length condition are extracted as the search condition items in the search condition item extraction step, the material property relationship graph is searched for a path satisfying the path length condition from the end point in addition to a path from the start point to the end point in the graph search step.

Eighth search mode: when the eighth search mode (mode 9) is extracted as the search mode and the start point and the path length condition are extracted as the search condition items in the search condition item extraction step, the material property relationship graph is searched for a path satisfying the path length condition from the start point in the graph search step.

Ninth search mode: when the ninth search mode (mode 10) is extracted as the search mode and the end point and the path length condition are extracted as the search condition items in the search condition item extraction step, the material property relationship graph is searched for a path starting from a node within a range satisfying the path length condition among paths to the end point in the graph search step.

In this manner, a search method capable of executing at least one of the nine types of search modes can be provided.

The third node may be a single node or a plurality of nodes. If the third node is a plurality of nodes, the user specifies whether the nodes are to be processed under the AND condition or the OR condition. For example, when a plurality of nodes are specified with the AND condition in the first search mode, a path passing through all of the plurality of nodes is searched for and, when the OR condition is specified, a path passing at least one of the plurality of nodes is searched for.

By making it possible to specify a plurality of nodes as the third node, the user's search conditions can be taken in more flexibly.

As the path length condition, various conditions such as within a predetermined range, equal to or longer than a predetermined path length, and the like may be specified in addition to within predetermined path length. The path length referred to herein may be defined by the number of edges to be passed through, or any other definition for calculating the path length may be adopted. For example, the path length may be defined by assigning quantified attributes related to material property relationships to each edge and calculating the total of attribute values along the path.

[10] Display Option 1

In [8], the search method further includes a search result output step (S5) (FIG. 7), and can execute at least one of the following first to third search modes. In the search result output step, a path matching the display option as a result of the graph search step is output as a search result from among a plurality of extracted paths.

Further, in the search condition extraction step, a display option is extracted based on the input search condition (S4).

In the search condition item extraction step, when the first search mode (mode 2) is extracted as the search mode and the start point, the end point, and the third node are extracted as the search condition items, the material property relationship graph is searched for a path passing through the third node among paths from the start point to the end point in the graph search step.

In the search condition item extraction step, when the second search mode (mode 3) is extracted as the search mode and the start point, the end point, and the third node are extracted as the search condition items, the material property relationship graph is searched for a path not passing through the third node among paths from the start point to the end point in the graph search step.

In the search condition item extraction step, when the third search mode (mode 7) is extracted as the search mode and the start point, the end point, and the path length condition are extracted as the search condition items, the material property relationship graph is searched for a path satisfying the path length condition among paths from the start point to the end point in the graph search step.

In this manner, it is possible to output only a certain path that matches the display option from among a plurality of paths extracted by the search, and it is possible to provide a function that helps the user find a desired path.

[11] Specific Example of Display Option 1

The search method described in [10] is configured to include at least one of the following first to sixth options as the display option.

First option: when the display option is the first option (No. 1, FIG. 3), all the paths extracted in the graph search step are output as search results in the search result output step.

Second option: when the display option is the second option (No. 2, FIG. 3), the path having the shortest path length extracted in the graph search step is output as a search result in the search result output step.

Third option: when the display option is the third option (No. 3, FIG. 3), paths having path length equal to or shorter than a first predetermined value extracted in the graph search step are output as search results in the search result output step.

Fourth option: when the display option is the fourth option (No. 4, FIG. 3), the search result output unit outputs a path having a path length equal to or longer than a second predetermined value and shorter than or equal to a third predetermined value among the paths output from the graph searcher, and outputs the searched path as a search result.

Fifth option: when the display option is the fifth option (No. 5, FIG. 3), the search result output unit outputs a path having a path length equal to or longer than a fourth predetermined value among the paths output from the graph searcher, and outputs the searched path as a search result.

Sixth option: when the display option is a sixth option (No. 6, FIG. 3), a difference between a path extracted in the graph search step and a path that should be displayed when any of the specified first to fifth options is made to act on the same search is output as a search result in the search result output step.

In this manner, it is possible to output only a certain path that matches the display option focusing on the path length out of a plurality of paths extracted by the search, providing a function that helps the user find a desired path.

[12] Display Option 2

The search method described in [8] further includes a search result output step (S5). In the search condition extraction step, a display option (FIG. 3) is further extracted based on the input search condition (S4).

When the display option is a predetermined first option (No. 7 "similar paths"), the search method is configured as follows.

The graph search step includes a first search step in which, when a start point and an end point are specified, the path from the start point to the end point is searched and the search result is output as the first search result, and a second search step in which a path from another start point that is different from the above start point to another end point that is different from the above end point, and is a path connecting the another start point and the another end point so as to include the largest number of nodes on the path included in the search result of the first graph search step is output as the second search result. In the search result output step, the second search result is output in addition to the first search result.

In this manner, a function to present another start point and another end point to a user instead of the material properties of the start point and end point of the path searched for by the user as a substitute can be provided.

[13] Display Option 3

The search method described in [8] further includes a search result output step (S5). In the search condition extraction step, a display option (FIG. 3) is further extracted based on the input search condition (S4).

When the display option is a predetermined second option (No. 8 "similar graph"), the search method is configured as follows.

The graph search step includes a first subgraph generation step in which, when a start point or an end point and a path length condition are specified, a subgraph by a node within the range satisfying the path length condition from the start point or a subgraph starting from a node within the range satisfying the path length condition among the paths to the end point is generated as a first subgraph, and a first subgraph generation step in which another subgraph having the highest similarity to the first subgraph is generated. In the search result output step, the another subgraph is output in addition to the first subgraph.

In this manner, a function to present a group of material property parameters having a certain relationship with the material properties searched by the user to the user as an alternative can be provided.

[14] Search System Including Graph Generator

The search method according to any one of [8] to [13] may further include a graph generation step (FIG. 4; flowchart is not illustrated).

In the graph generation step, the material property relationship graph is generated from a database composed of a plurality of parameter pairs of material property parameters having a mutual relationship and is stored in the memory.

In this manner, the material property relationship graph can be generated in the search system.

2. DETAILS OF THE EMBODIMENTS

The embodiments will be described in more detail.

First Embodiment

FIG. 1 is a block diagram illustrating a configuration example of a search system according to a first embodiment.

The search system 10 includes a material property relationship graph 3, a graph searcher 4 and a user interface 5.

The material property relationship graph 3 is a graph composed of a plurality of pairs of material property parameters having mutual relationships. Each material property parameter is associated with one node, and nodes corresponding to a pair having a mutual relationship is connected by an edge. Here, the material property parameter pairs having mutual relationships may desirably be collected from as many technical fields as possible. Here, pairs of material property parameters having mutual relationships are not limited to those based on scientific evidence-based relationships, i.e., those based on theoretically explained relationships: those known to have mutual relationships due to obvious correlation found from experimental data may also be included in the pairs of material property parameters even if they have not been theoretically explained or have not been formulated. Besides formulated relationships like theorems and formulae, the "theoretically explained relationships" may widely include semi-quantitative or qualitative relationships explaining presence/absence of correlation or positive/negative of correlation coefficients (i.e., while one of the correlation coefficients increases, the other also increases or decreases, etc.). Here, it is not necessary for relationships known in any field to be excluded, and pairs of material property parameters of which relationships are known in every field may be included.

The graph searcher 4 performs a path search in the material property relationship graph 3 based on the input search conditions and outputs extracted path information, or generates and outputs a subgraph that matches the search conditions input from the material property relationship graph 3. Various path search algorithms based on graph theories can be applied to the graph searcher 4.

A start point and an end point can be specified as search conditions, and a path in the material property relationship graph 3 can be searched for and output as a search result. Further, a start point or an end point and a path length condition from the start point to the end point can be specified as search conditions, and a subgraph at a portion matching the path length condition centered on the start point or the end point from the material property relationship graph 3 can be output as a search result.

In this manner, the search system 10 can search for an unknown combination of material property parameters having a significant relationship based on an already known relationship among arbitrary combinations of a plurality of material property parameters.

By integrating relationships that have been known only in different technical fields and expressing them in the material property relationship graph 3, a user can execute a path search in the entire graph irrespective of in what technical field all the relationships have been known. A user can execute a path search based only on presence or absence of edges irrespective of in what technical field the relationship corresponding to the edge has been known. Therefore, a search can be executed across many fields. Thus, an unknown combination of material property parameters having a significant relationship can also be found in addition to already known relationships of material property parameters.

A "graph" means a range having a plurality of nodes and a plurality of edges connecting the nodes, in which all the nodes are directly or indirectly connected by the edges. A single graph may be a collection of a plurality of graphs (subgraphs).

Further, the material property relationship graph 3 is desirably a directed graph. This is because the relationship between material property parameter pairs cannot always be defined bidirectionally. However, an undirected graph can also be adopted as the search system. While it has an advantage that the search algorithm is simplified, there is a risk that paths containing relationships in directions having no causal relationships in reality will be extracted. Such a risk can be avoided by adding post-processing to eliminate paths including relationships in directions having no causal relationships in reality in the latter stage.

Search Mode

The invention can provide a wider variety of search modes.

The user interface 5 includes a search condition extractor 51, which extracts, based on the input search conditions, a start point or an end point or both a start point and an end point, and a third node different from the start point and the end point or a path length condition and supplies the extracted items to the graph searcher 4 as search condition items. The graph searcher 4 searches, depending on the supplied search condition items, the material property relationship graph 3 and outputs a path or a subgraph that matches the input search condition as a search result.

In contrast to the conventional search mode in which the start point and the end point are specified as the search conditions and the path search of the material property relationship graph 3 is executed, by adding a third node different from both the start point and the end point or a path length condition is added as a search condition in addition to the start point and the end point, or by specifying one of the start point or the end point and the path length condition as the search condition, the search method can be greatly diversified while minimizing the items to be added as search conditions.

FIG. 2 is an explanatory diagram illustrating a search mode that can be executed in the first embodiment. The search mode "mode," the query "query," and the output of the search "output of the search operation" are shown in a tabular form.

In contrast to the conventional search mode in which the start point A and the end point B are specified as the search conditions and the path search of the material property relationship graph 3 is executed (first search mode), by further adding a third node different from the start point and the end point as a search condition, the following five search modes can be added.

Inclusive path search for searching for a path via the added third node D (second search mode)

Exclusive path search for searching for a path not via the added third node D (third search mode)

A path search for outputting a common path, an uncommon path, or a sum graph between a path from a start point to an end point and a path from a start point to a third node (fourth search mode)

A path search for outputting a common path, an uncommon path, or a sum graph between a path from a start point to an end point and a path from a third node to an end point (fifth search mode)

A path search that outputs a path from the end point to a third node in addition to a path from a start point to an end point (sixth search mode)

Here, the third node may be a single node ("D") or a plurality of nodes. When specifying a plurality of nodes, the user specifies whether the plurality of nodes are to be processed under the logical product (AND) condition ("D1 and D2 . . . ") or under the logical sum (OR) condition ("D1 or D2 . . . "). For example, when a plurality of nodes are specified with the AND condition in the first search mode, a path passing through all of the plurality of nodes is searched for and, when the OR condition is specified, a path passing at least one of the plurality of nodes is searched for.

The second search mode (inclusive path search) is helpful for a path search in a case in which the user wants to optimize the material property parameter corresponding to the third node in the middle of the path when the material property parameter corresponding to the start point is controlled and the material property parameter corresponding to the end point is to be optimized. On the other hand, the third search mode (exclusive path search) is helpful for a path search in a case in which the user does not want to change the material property parameter corresponding to the additionally specified third node when the material property parameter corresponding to the start point is controlled and the material property parameter corresponding to the end point is to be optimized.

The fourth search mode is helpful for a path search in a case in which the user wants to optimize the material property parameter corresponding to the third node out of the path when the material property parameter corresponding to the start point is controlled and the material property parameter corresponding to the end point is to be optimized. Further, the fifth search mode can encourage the user to discover a start point that he/she did not initially anticipate when controlling the material property parameter corresponding to the start point and optimizing the material property parameter corresponding to the end point. With the start point, the material property parameter corresponding to the end point can be optimized even if the material property parameter corresponding to the third node outside the path is controlled.

In contrast to the conventional search mode (first search mode) in which the start point and the end point are specified as the search conditions and the path search of the material property relationship graph 3 is executed, by further adding the path length condition as the search condition instead of the third node, the following two search modes can be added.

A path search for extracting only a path that satisfies a path length condition from among the paths from the start point to the end point (seventh search mode)

A path search for outputting a path from an end point to a node within a range that satisfies a path length condition in addition to a path from the start point to the end point (eighth search mode)

Here, as the path length condition, various conditions such as within a predetermined range, equal to or longer than a predetermined path length, and the like may be specified in addition to within predetermined path length.

The seventh search mode is effective for a path search for the purpose of suppressing the material property parameters affected by the control as much as possible and finding conditions that can be directly controlled when the material property parameter corresponding to the start point is controlled and the material property parameter corresponding to the end point is optimized.

The eighth search mode assists in finding a material property parameter that can be optimized together with the material property parameter corresponding to the end point when the material property parameter corresponding to the start point is controlled and the material property parameter corresponding to the end point is optimized.

By specifying one of the start point or the end point and the path length condition as the search conditions instead of executing the conventional path search in which both the start point and the end point are specified as the search conditions, the following two types of search mode can be added.

A path search that outputs a range that satisfies the path length condition from the start point as a subgraph when the start point and the path length condition are specified (ninth search mode)

A path search that outputs a range that satisfies the path length condition among paths to the end point when the end point and the path length condition are specified (10th search mode)

In this manner, by adding a third node different from both the start point and the end point or a path length condition is added as a search condition in addition to the start point and the end point, or by specifying one of the start point or the end point and the path length condition as the search condition, the search method can be greatly diversified while minimizing the items to be added as search conditions.

According to the ninth search mode, the possibility that the material property to be controlled (corresponding to the start point) affects the material property that should not be changed unexpectedly can be found in advance.

According to the 10th search mode, there is a possibility that unexpected material properties (a start point the user did not anticipate) that can control the material property (corresponding to the end point) which is the target of optimization.

It is not necessary to implement all of the first to 10th search modes illustrated in FIG. 2 in the search system 10 and only the needed search modes can be implemented. Further, search modes other than those illustrated in FIG. 2 may be implemented additionally.

For example, in the ninth and 10th search modes, instead of setting the path length condition to "path length of m nodes or less," a search mode in which a range is specified, such as "path length is equal to or longer than m1 or shorter than and equal to m2" may be added (11th and 12th search modes). Even in this case, the number of items to define the search conditions is three, which is almost as small as that in each of the first to 10th search modes.

The path length can be defined as the number of nodes or the number of edges to be passed through on the path from the start point node to the end point node. Alternatively, another definition for calculating the path length may be adopted. For example, definition of the path length in consideration of the priority may be adopted. Details will be described later.

APPLICATION EXAMPLE 1

Figure 10:
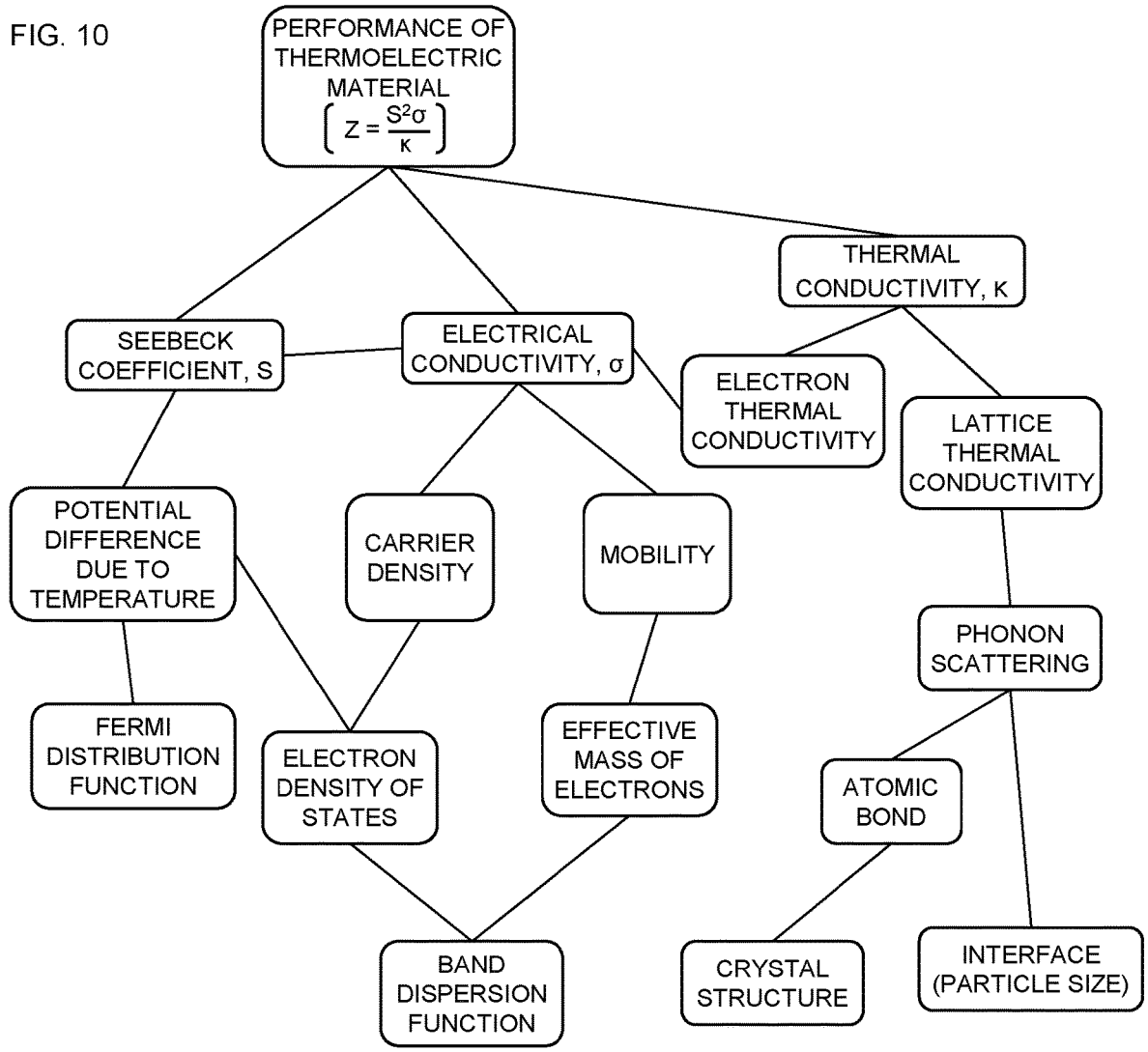
FIG. 10 is an explanatory diagram illustrating an example of a material property relationship graph to which an example of a material property optimization search is to be applied.

FIG. 10 is a material property relationship graph to which an example of the material property optimization search is applied.

The material property name is displayed on each node, and the material properties having a mutual relationship are connected by an edge. For example, performance of a thermoelectric material depends on the Seebeck coefficient, electrical conductivity and thermal conductivity, and is calculated using the formula illustrated in FIG. 10.

An example of optimizing performance of a thermoelectric material by controlling the electron density of states will be described.

Simply, a path search is executed with the electron density of states as the start point and the performance of the thermoelectric material as the end point. The relationships are cumulatively traced along the path to determine the Electron Density of States for optimizing the performance of the thermoelectric material. Here, the paths output as the search result include, for example, the following three paths.

[Electron Density of States]-[Potential Difference Due to Temperature]-[Seebeck Coefficient]-[Performance of Thermoelectric Material]

[Electron Density of States]-[Carrier Density]-[Electrical Conductivity]-[Performance of Thermoelectric Materials]

[Electron Density of States]-[Carrier Density]-[Electrical Conductivity]-[Electronic Thermal Conductivity]-[Thermal Conductivity]-[Performance of Thermoelectric Materials]

Here, when the user has some interest in the electron thermal conductivity (for example, when the user does not want to change the electron thermal conductivity), he/she conducts an inclusive path search (second search mode) in which the electron thermal conductivity is specified as the third node.

As a result, [Electron Density of States]-[Carrier Density]-[Electrical Conductivity]-[Electron Thermal Conductivity]-[Thermal Conductivityl]-[Performance of Thermoelectric Material] is extracted. From this, it is found that when the electron density of states is controlled in this path, the electrical conductivity and the thermal conductivity also change.

Since the performance of the thermoelectric material is proportional to the electrical conductivity and inversely proportional to the thermal conductivity, the illustrated formula shows that the higher electrical conductivity and the lower thermal conductivity are desirable in order to increase the performance of the thermoelectric material.

However, it is known that, in materials having high electrical conductivity, that is, materials with metallic conductivity, the electrical conductivity and the electron thermal conductivity are in a proportional relationship and, therefore, the relationship of "high electrical conductivity and low thermal conductivity" is incompatible. However, this is the knowledge that the user has, and is not derived from the search results of this search system.

Therefore, the user is to consider a measure to lower the thermal conductivity without changing the electron thermal conductivity.

When an exclusive path search (third search mode) in which electron thermal conductivity is specified as the third node is conducted, the following two paths are extracted as the search results.

[Electron Density of States]-[Potential Difference Due to Temperature]-[Seebeck Coefficient]-[Performance of Thermoelectric Material]

[Electron Density of States]-[Carrier Density]-[Electrical Conductivity]-[Performance of Thermoelectric Materials]

Alternatively, a path search (10th search mode) is conducted in which the start point is not specified, the end point is the performance of the thermoelectric material, and the path length is within 5 path length of the result of the inclusive path search. In this manner, there is a possibility that unexpected material properties (a start point the user did not anticipate) that can control the material property (corresponding to the end point) which is the target of optimization. In this application example, the following path is extracted.

[Lattice Thermal Conductivity]-[Thermal Conductivity]-[Performance of Thermoelectric Materials]

It is found that it is possible to control material properties that optimize the performance of thermoelectric materials also by controlling the lattice thermal conductivity instead of controlling the Electron Density of States, which the user initially thought was the control target of the starting point.

APPLICATION EXAMPLE 2

Figure 11:
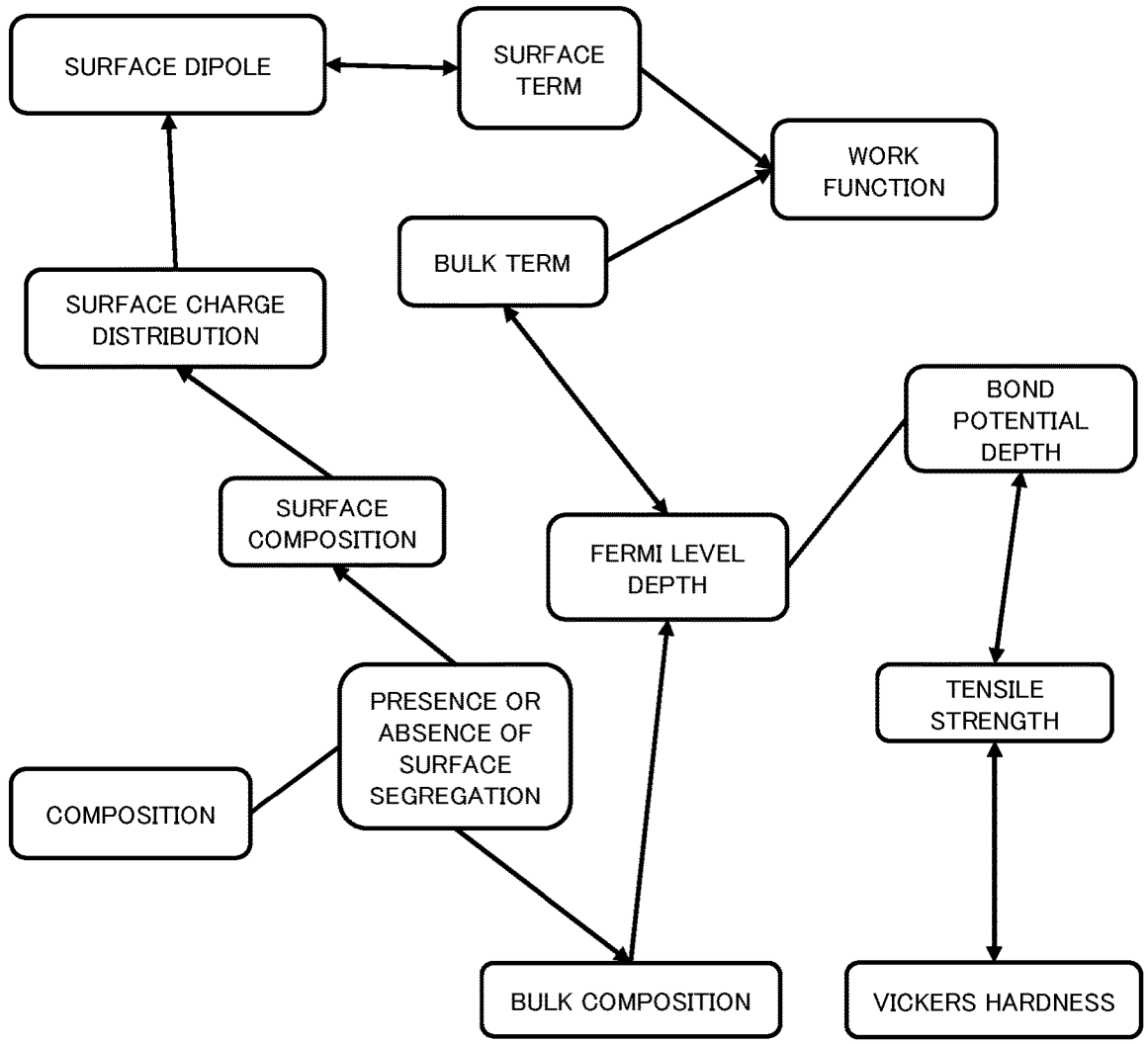
FIG. 11 is an explanatory diagram illustrating an example of a material property relationship graph to which another example of a material property optimization search is to be applied.

FIG. 11 is a material property relationship graph to which another example of the material property optimization search is applied.

The material property name is displayed on each node, and the material properties having a mutual relationship are connected by an edge.

An example of optimizing the work function by controlling the composition will be described.

The user basically searches for a path with a start point being the composition and an end point being the work function, but when he has some interest in the bulk composition, he/she will conduct an inclusive path search specifying the bulk composition as the third node (second search mode). As a result, the following path is extracted.

[Composition]-[Presence/Absence Of Surface Segregation]-[Bulk Composition]-[Fermi Level Depth]-[Bulk Term]-[Work Function]

Here, a change in bulk composition during the control process is focused on and its side effects will be considered. Therefore, the path search in the ninth search mode is executed with the bulk composition as the start point and the path length set to 5 or shorter. The path length 5 is a value according to the path length of the path extracted above. As a result, the following path is extracted.

[Bulk Composition]-[Fermi Level Depth]-[Bound Potential Depth]-[Tensile Strength]-[Vickers Hardness]

Therefore, it is found that if control is conducted via the bulk composition starting from the composition in order to optimize the work function, the Vickers hardness is also changed.

Therefore, the user performs an exclusive path search (third search mode) in which the start point is the composition, the end point is the work function, and the bulk composition is the third node. As a result, the following path is extracted.

[Composition]-[Presence/Absence Of Surface Segregation]-[Surface Composition]-[Surface Charge Distribution]-[Surface Dipole]-[Surface Term]-[Work Function]

In this manner, even if the composition is controlled, it is possible to find a path in which the work function can be optimized without changing the bulk composition and the Vickers hardness.

Display Options

By further adding a display option to each of the various search modes, it is possible to encourage the users to have notice and help them find desired paths.

FIG. 3 is an explanatory diagram illustrating display options that can be additionally specified in the first embodiment. The option number "No.," the display option "display option" and its operation "display operation" are shown in a tabular format.

Display option 1 "all paths" is to display all paths that match the search conditions.

The display option 2 "shortest path" is to display the shortest path among all the paths that match the search conditions specified by the query. Further, a display option to display q paths in the order from the shortest, such as "shortest q paths" may be added.

The display option 3 "within p paths" is to display the paths having a predetermined path length p or shorter among all the paths matching the search conditions specified by the query.

The display option 4 "within p1-p2 paths" is to display the paths having a predetermined path length of p1 or longer and p2 or shorter among all the paths that match the search conditions specified by the query.

The display option 5 "beyond p paths" is to display the paths having a predetermined path length p or longer among all the paths that match the search conditions specified by the query.

The display option 6 "difference with [opt. No.]" is to display the difference between the current search result and the specified display option [opt. No.].

The display options 1 to 6 can be specified in combination with the first, second, third, seventh search modes, and so forth illustrated in FIG. 2.

Further advanced display options may be added.

The display option 7 "similar paths" is to display another search condition to share many paths with the search results.

For example, when the start point A and the end point B are specified as search conditions and the path search in the first search mode is executed, a path from another start point A' to another end point B', which has as many common paths as possible with the path extracted as a result of the path search, is extracted to indicate to the user that the search condition "start point A', end point B'" exists.

Here, "as many common paths as possible" can be quantified by, for example, the number of nodes and edges that are common to the two paths. The number of paths having a common path may be taken into consideration as well.

A function to present another start point and another end point to a user instead of the material properties of the start point and end point of the path searched for by the user as an alternative can be provided.

The display option 8 "similar graph" is to display another search condition that has a graph similar to the search result.

The display option 8 is an option to display another subgraph with a high degree of similarity to the subgraph output as the search result when, for example, the start point or the end point and the path length condition are specified as search conditions, and the path search that outputs a range satisfying the path length condition from the start point as a subgraph (ninth search mode), or the path search that outputs a range satisfying the path length condition among the paths to the end point as a subgraph (10th search mode) is executed. Here, the term similarity means the similarity generally used in the graph theory. For example, when each node and each edge in a subgraph can be associated one to one between two subgraphs to be compared, it is defined that the two subgraphs are equal, i.e. have the greatest similarity. The similarity can be quantified by quantifying the number and attributes of nodes and edges that cannot be associated with each other and subtracting the obtained value from the maximum similarity.

In this manner, a function to present a group of material property parameters having a certain relationship with the material properties searched by the user to the user as an alternative can be provided.

For example, a same mathematical formula may theoretically explain relationships between completely different material properties in completely different fields. Regarding a relationship that is not yet theoretically explained in the field the user is searching, if the user find that the relationship is similar to a relationship between other material properties in other fields, he/she can hypothesize that the relationship can be explained with the same mathematical formula. It is expected that users will be encouraged to have some notice by being presented a group of material properties having similar relationships, if there is no extreme hypothesis of "explaining with the same mathematical formula."

Some examples described as search modes in FIG. 2 can be changed to a combination of a simple search mode and the following display options illustrated in FIG. 3. The combination of the simple search mode and the display option realizes the similar search function to the high-performance search mode of FIG. 2 as described below, these functions may be replaced with each other (i.e., either one function can be implemented), however, both functions may be implemented.

Further, for example, the output as the search result of the common path and the uncommon path in the fourth and fifth search modes can be changed to a combination of the first search mode and the following display options.

The display option 9 "common paths with from A to X" is to display a path common to the search result and a path from the start point A to the end point X. By specifying the display option 9 in combination with the first search mode "search paths from A to B," the user can be provided with a similar search function to the common path search "search paths from A to B AND Y to B" in the fourth search mode.

The display option 10 "uncommon paths with from A to X" is to display a path uncommon to the search result and a path from the start point A to the end point X. By specifying the display option 10 in combination with the first search mode "search paths from A to B," the user can be provided with the same search function as the uncommon path search "search paths from A to B NOT A to X" in the fourth search mode.

The display option 11 "common paths with from Y to B" is to display a path common to the search result and a path from the start point Y to the end point B. By specifying the display option 11 in combination with the first search mode "search paths from A to B," the user can be provided with a similar search function to the common path search "search paths from A to B AND Y to B" in the fifth search mode.

The display option 12 "uncommon paths with from Y to B" is to display a path uncommon to the search result and a path from the start point Y to the end point B. The user can be provided with a similar search function to the uncommon path search "search paths from A to B NOT Y to B" in the fifth search mode.

Further, for example, the output as the search result in the sixth and eighth search modes can be changed to a combination of the first search mode and the following display options.

The display option 13 "from the end node to D" is to also display the path from the end point to the node D. By specifying in combination with the first search mode "search paths from A to B," the user can be provided with a similar search function "search paths from A to B OR B to D" in the sixth search mode.

The display option 14 "around the end node within m paths" is to display the paths within the range of the path length m from the end point around the end point. By specifying the display option 14 in combination with the first search mode "search paths from A to B," the user can be provided with a similar search function "search paths from A to B OR around B within m" in the eighth search mode.

Path Length Considering Priority

In the foregoing description, the path length is the number of nodes or the number of edges to be passed through on the path from the start point node to the end point node. However, the path length may be set in consideration of the priority.

By giving attribute information to at least some of the nodes and edges of the material property relationship graph 3, it is possible to preferentially handle paths that are of higher interest to the user based on the attribute information. The score obtained by quantifying the attribute information and weighting and adding along the path can be used as the path length.

FIG. 8 is an explanatory diagram illustrating an example of a material property relationship database that provides attribute information to edges of a material property relationship graph 3.

In FIG. 8, the node names themselves are shown as the material property parameter names, and the relationship between the cause-side material property parameter and the result-side material property parameter, their reliability, and the condition to which the relationship is applied are stored for each pair of material property parameters corresponding to each edge.

The reliability can be defined based on whether the relationship between the material property parameter pairs is a theoretically established relationship, a relationship that is only empirically known and not theoretically supported, and the like. By assigning a smaller value as the reliability is higher, when the sum of the reliability is calculated along the path from the start point to the result-side material property parameter, the smaller the value, the more reliable the path becomes.

FIG. 9 is an explanatory diagram illustrating an example of a material property relationship database that provides attribute information to nodes of the material property relationship graph 3.

Since each entry (each row) corresponds to an edge in FIG. 8, it is not suitable for describing the attribute information given to the node. Therefore, a database in which each entry corresponds to the node is added as illustrated in FIG. 9.

Also in FIG. 9, the node name itself is described as the material property parameter name, and the number of edges when mapped to the graph is stored separately for the number of outgoing edges and the entering edges, and the measurability of the material property value, the data volume of database, and the material property value are stored respectively. Measurability is an index indicating the ease of measuring material property values. The data volume of the database is the data volume stored in the database. The material property value is the specific material property value itself Attribute information given to the edges illustrated in FIG. 8 and the type and the number of attribute information given to the nodes illustrated in FIG. 9 are illustrative only and can be changed arbitrarily. Further, the attribute information may be given only to the edges or only to the nodes, or may be given to both.

When a plurality of types of attribute information are given, they can be weighted and added to calculate path scores, which can be used as path lengths. By adjusting the weighting, it is possible to selectively change the attribute information to be emphasized, not emphasized, or ignored.

For example, by increasing the weight of reliability, it is possible to output a search result with priority given to a path having high reliability. The attribute information of the number of edges assigned to the node represents the number of material properties having a relationship with the material property. Therefore, when the user wants to find a path controlled to be optimized so as not to change other material properties as much as possible, the user can perform weighting so as to give priority to a path having a smaller number of edges.

In this manner, by adopting the path length in consideration of priority, the search result desired by the user can be efficiently obtained.

System Including Graph Generator

It is desirable that the search system 10 further includes a material property parameter relationship database and a graph generator.

FIG. 4 is a block diagram illustrating a modified example of the search system of the first embodiment.

The material property parameter relationship database 1 stores a plurality of parameter pairs of material property parameters having mutual relationships. The graph generator 2 generates a material property relationship graph 3 in which a plurality of material property parameters included in the parameter pairs are nodes and in between the nodes corresponding to the parameter pairs are edges.

In this manner, the material property relationship graph can be generated in the search system.

Hardware/Software Embodiments

The search system 10 of the present invention is constructed to function as software on a hardware system including a storage device and a computer.

Figure 5:
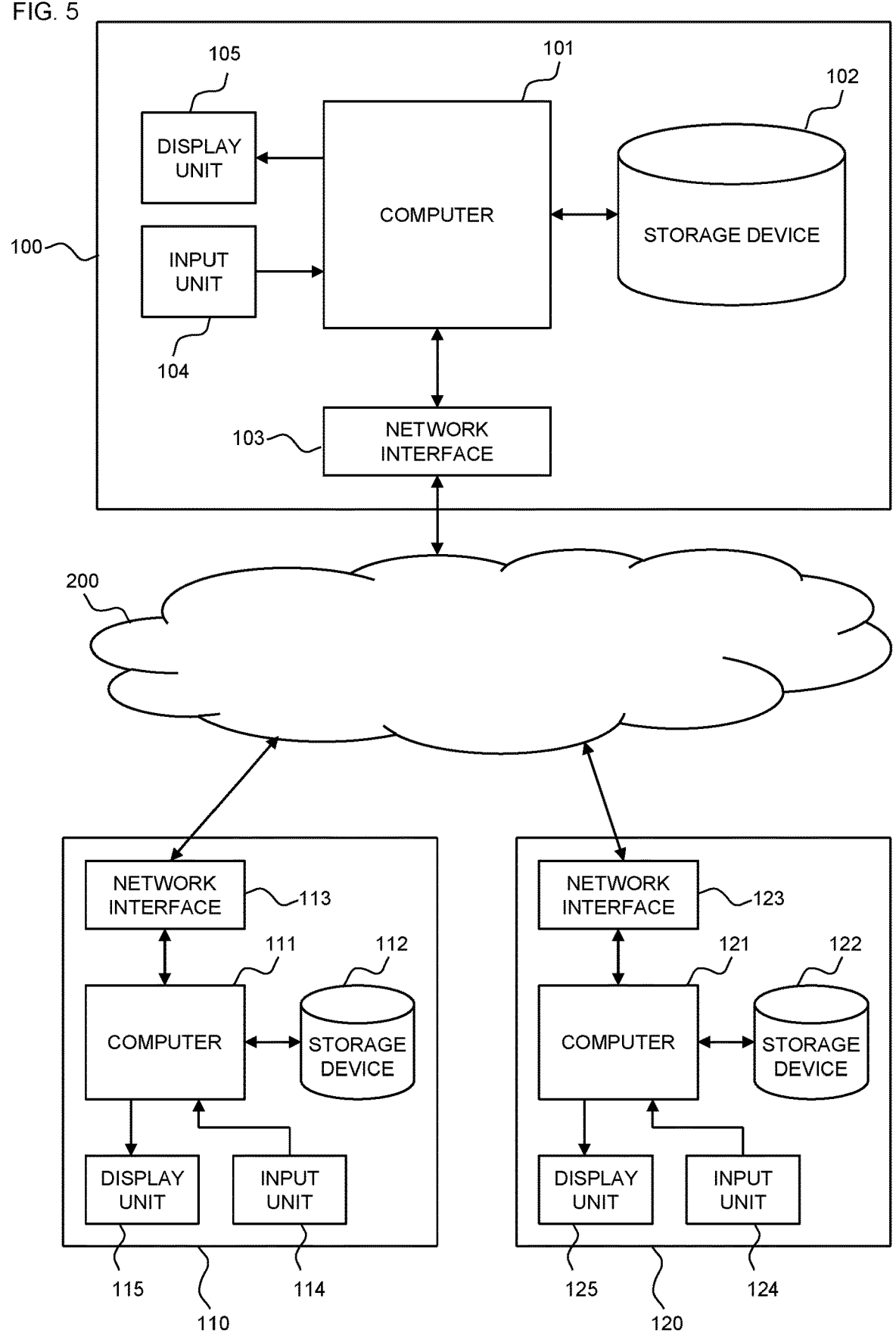
FIG. 5 is a block diagram illustrating an example of a hardware system in which the search system of the present invention is implemented.

FIG. 5 is a block diagram illustrating an example of a hardware system in which the search system 10 of the present invention is implemented.

A server 100 and user-side workstations 110 and 120 are connected to a network 200 such as the Internet. The server 100 includes a computer 101, a storage device 102, a network interface 103, an input unit 104, and a display unit 105.

If the input and output via the network 200 is sufficient, provision of the input unit 104 and the display unit 105 may be optional. The user-side workstations 110 and 120 also include computers 111 and 121, storage devices 112 and 122, network interfaces 113 and 123, input units 114 and 124, and display units 115 and 125, respectively. The search system 10 may also be implemented without being connected to the network 200. The network interface 103 may be omitted from the server 100, and the entire search system 10 of the invention may be implemented in the computer 101, the storage device 102, the input unit 104, and the display unit 105.

The material property parameter relationship database 1 of the search system 10 is stored in the storage device 102, and the graph generator 2 is software that operates on the computer 101. The material property relationship graph 3 generated by the graph generator 2 is stored in the storage device 102 as intermediate data and is used as input data of the graph searcher 4 implemented as software on the computer 101.

The user interface 5 of the search system 10 is implemented by using the input units 114 and 124 and the display units 115 and 125, respectively, of the user-side workstations 110 and 120. A search condition is provided from the user-side workstations 110 and 120 to the graph searcher 4 via the user interface 5, and a search result is returned.

The graph searcher 4 may be implemented as software in the computers 111 and 121 of the user-side workstations 110 and 120 instead of or in addition to the server 100. Here, the material property relationship graph 3 is supplied from the server 100 in response to a request from the user-side workstations 110 and 120. The material property relationship graph 3 may be downloaded in advance and stored in the storage devices 112 and 122 of the workstations 110 and 120 before the path search is executed. In this manner, the path search process by the graph searcher 4 is speeded up. Especially when many users are to execute the graph search process at the same time, concentration of processing load on the server 100 can be prevented.

Second Embodiment

The search system 10 illustrated in FIGS. 1 and 4 can be implemented on various types of hardware as illustrated in FIG. 5 and described above. The search method is generally implemented by software running on a computer equipped with a storage device.

FIG. 6 is a flowchart illustrating the search method of the present invention.

The search method includes a search condition item extraction step (S1), a graph search step (S2) and a search result output step (S3).

In the search condition item extraction step (S1), a search mode and a search condition item are extracted from an input search condition. In the graph search step (S2), a material property relationship graph 3 is searched based on the extracted search mode and the search condition item, and a path or a subgraph extracted by the search in accordance with the search mode and the search condition item are output as a search result. In the search result output step (S3), the search result extracted in the graph search step (S2) is output from the search system 10.

Here, the search mode and the search items extracted in the search condition item extraction step (S1), and the path search executed in the graph search step (S2) accordingly are the same as those illustrated in FIG. 2 and described in the first embodiment. The search condition item is, in accordance with the search mode, the start point of the path search, the end point of the path search, the third node, which is different from both the start point and the end point, or the start point and/or the end point and the path length condition.

In contrast to the conventional search mode in which the start point and the end point are specified as the search conditions and the path search of the material property relationship graph 3 is executed, by adding a third node different from both the start point and the end point or a path length condition is added as a search condition in addition to the start point and the end point, or by specifying one of the start point or the end point and the path length condition as the search condition, the search method can be greatly diversified while minimizing the items to be added as search conditions.

Figure 7:
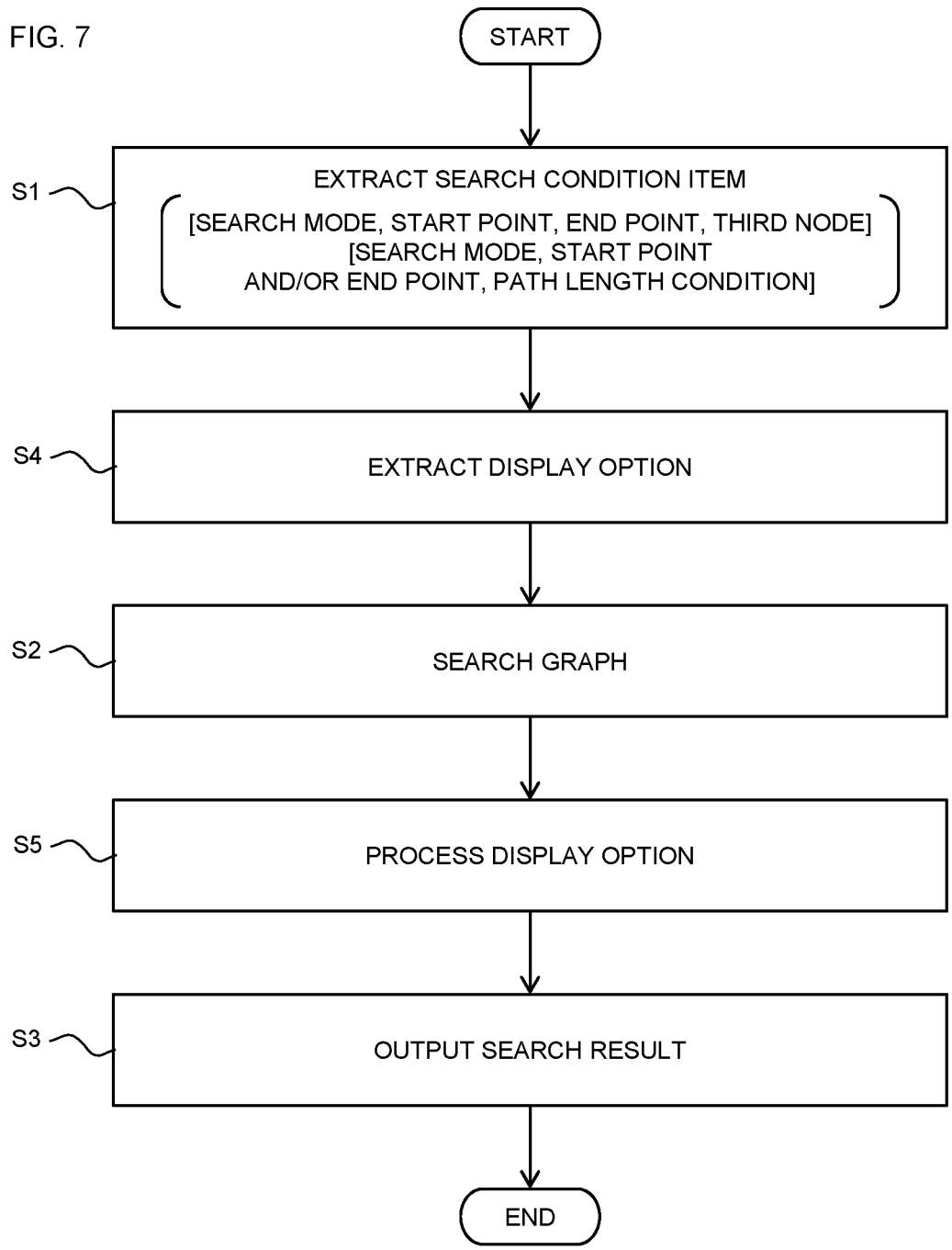
FIG. 7 is a flowchart illustrating a modified example of the search method of the present invention.

FIG. 7 is a flowchart illustrating a modified example of the search method of the present invention.

In the modified example, a display option extraction step (S4) and a display option processing step (S5) are added.

The display option is similar to that illustrated in FIG. 3 and described in the First Embodiment. Since the display option is a part of the input search condition, the display option extraction step (S4) may be included in the search condition item extraction step (S1). Further, processing of the display contents in accordance with the specified display option is executed in the display option processing step (S5), which processing may also be included in the search result output step (S3).

By adding a display option to each of the various search modes, it is possible to encourage the users to have notice and help them find desired paths.

While the invention made by the inventor has been particularly described with respect to the embodiments thereof, the invention is not limited thereto and other changes may be made therein without departing from the spirit and scope of the invention.

INDUSTRIAL APPLICABILITY

The invention relates to a search system and a search method using a database, and more particularly, the invention is capable of being suitably used for a path search in graphs showing relationships among material property parameters.

EXPLANATION OF SIGN

1 Material property parameter relationship database
2 Graph generator
3 Material property relationship graph
4 Graph searcher
5 User interface
10 Search system
51 Search condition extractor
52 Search result output unit
100 Server
110, 120 Workstation
101, 111, 121 Calculator
102, 112, 122 Storage Device
103, 113, 123 Network interface
104, 114, 124 Input unit
105, 115, 125 Display unit
200 Network

The invention claimed is:

1. A search system, implemented by a processor equipped with a storage device, comprising a graph searcher that executes a path search in a material property relationship graph, and a search condition extractor that supplies a plurality of search condition items to the graph searcher based on an input search condition, wherein:

the material property relationship graph includes a plurality of nodes each of which corresponds to each of a plurality of material property parameters and edges each of which connects a pair of nodes corresponding to a plurality of material property parameter pairs having mutual relationship;

the search condition extractor extracts, based on the search conditions, a start point or an end point or both a start point and an end point, and a third node different from the start point and the end point or a path length condition and supplies the extracted items to the graph searcher as the search condition item; and the graph searcher, depending on the supplied search condition item, searches the material property relationship graph, and outputs a path or a subgraph that matches the search conditions as a search result.

2. The search system according to claim 1, wherein the graph searcher is capable of executing at least one of search modes of:

a first search mode in which, when a start point, an end point and a third node are specified, a path passing through the third node is searched for from among the paths from the start point to the end point, a second search mode in which, when a start point, an end point and a third node are specified, a path not passing through the third node is searched for from among the paths from the start point to the end point, a third search mode in which, when a start point, an end point and a path length condition are specified, a path satisfying the path length condition is searched for from among the paths from the start point to the end point, a fourth search mode in which, when a start point, an end point and a third node are specified, at least one of a common path common to a path from the start point to the end point and a path from the start point to the third node, an uncommon path uncommon to these paths, and a subgraph based on the sum of a first subgraph by a plurality of paths from the start point to the end point and a second subgraph by a plurality of paths from the start point to the third node is output, a fifth search mode in which, when a start point, an end point and a third node are specified, at least one of a common path common to a path from the start point to the end point and a path from the third node to the end point, an uncommon path uncommon to these paths, and a subgraph based on the sum of the first subgraph by a plurality of paths from the start point to the end point and the third subgraph by a plurality of paths from the third node to the end point is output, a sixth search mode in which, when a start point, an end point and third node are specified, a path from the end point to the third node in addition to a path from the start point to the end point are searched for, a seventh search mode in which, when a start point, an end point and a path length condition are specified, a path that satisfies the path length condition from the end point in addition to the path from the start point to the end point are searched for, an eighth search mode in which, when a start point and a path length condition are specified, a path within a range satisfying the path length condition from the start point is searched for, and a ninth search mode in which, when an end point and a path length condition are specified, a path that starts from a node present within the range that satisfies the path length condition is searched for among the paths ending at the end point, and outputting the result as a search result.

3. The search system according to claim 1, further comprising a search result output unit, wherein:

the search condition extractor extracts a display option based on the input search condition and supplies the extracted display option to the search result output unit;

the graph searcher is configured to be capable of executing at least one of search modes of:

a first search mode in which, when a start point, an end point and a third node are specified, a path passing through the third node is searched for from among the paths from the start point to the end point, a second search mode in which, when a start point, an end point and a third node are specified, a path not passing through the third node is searched for from among the paths from the start point to the end point, and a third search mode in which, when the start point, the end point and the path length condition are specified, a path satisfying the path length condition is searched for from among the paths from the start point to the end point;

and supplying a result to the search result output unit; and the search result output unit outputs, as a search result, a path that matches the display option from among a plurality of paths supplied from the graph searcher.

4. The search system according to claim 3, wherein:

the display option includes at least one of a first to a sixth options;

when the display option is a first option, the search result output unit outputs all the paths output from the graph searcher as search results;

when the display option is a second option, the search result output unit outputs a path having the shortest path length among the paths output from the graph searcher as a search result;

when the display option is a third option, the search result output unit outputs a path having a path length equal to or shorter than a first predetermined value among the paths output from the graph searcher as a search result;

when the display option is a fourth option, the search result output unit outputs a path having a path length equal to or longer than a second predetermined value and shorter than or equal to a third predetermined value among the paths output from the graph searcher as a search result;

when the display option is a fifth option, the search result output unit outputs a path having a path length equal to or longer than a fourth predetermined value among the paths output from the graph searcher as a search result; and when the display option is a sixth option, the search result output unit outputs a difference between a path output from the graph searcher and a path that should be displayed when any of the specified first to fifth options is made to act on the same search as a search result.

5. The search system according to claim 1, further comprising a search result output unit, wherein:

the search condition extractor extracts a display option based on the input search condition and supplies the extracted display option to the graph searcher and the search result output unit;

when the display option is a predetermined first option, when a start point and an end point are specified, the search condition extractor searches for a path from the start point to the end point and outputs a result to the search result output unit as a first search result;

the search condition extractor further outputs a path from another start point different from the above start point to another end point different from the above end point, and is a path connecting the another start point and the another end point so as to include the largest number of nodes on the path included in the search result of the first search result to the search result output unit as a second search result; and the search result output unit outputs the second search result in addition to the first search result.

6. The search system according to claim 1, further comprising a search result output unit, wherein:

the search condition extractor extracts a display option based on the input search condition and supplies the extracted display option to the graph searcher and the search result output unit;

when the display option is a predetermined second option, when a start point or an end point and a path length condition are specified, the graph searcher outputs a subgraph composed of nodes within a range that satisfies the path length condition from the start point or a subgraph starting from a node within a range that satisfies the path length condition among the paths ending at the end point to the search result output unit as a first subgraph;

the graph searcher further outputs another subgraph having the highest degree of similarity to the first subgraph to the search result output unit; and the search result output unit outputs the another subgraph in addition to the first subgraph.

7. The search system according to claim 1, further comprising a database and a graph generator, wherein:

the database stores a plurality of parameter pairs of material property parameters having mutual relationships in the storage device, and the graph generator generates a material property relationship graph in which a plurality of material property parameters included in the parameter pairs are nodes and in between the nodes corresponding to the parameter pairs are edges.

8. A search method executed on a computer for a material property relationship graph stored in the memory based on input search condition, the computer being capable of accessing a memory, wherein:

the material property relationship graph is composed of a plurality of nodes each corresponding to each of a plurality of material property parameters and edges each connecting a pair of nodes corresponding to a plurality of material property parameter pairs having mutual relationships; and the search condition includes a start point or an end point or both a start point and an end point, and a third node different from the start point and the end point or a path length condition as a search condition item;

the search method includes
a search condition item extraction step in which a search mode and a search condition item are extracted based on the search condition, and
a graph search step in which the material property relationship graph is searched according to the extracted search mode and search condition item, and a path or a subgraph specified by the search mode and the search condition item is output as a search result.

9. The search method according to claim 8, wherein:
when a first search mode is extracted as the search mode and a start point, an end point and a third node are extracted as the search condition items in the search condition item extraction step,
the material property relationship graph is searched for a path passing through the third node among paths from the start point to the end point in the graph search step;
when a second search mode is extracted as the search mode and a start point, an end point and a third node are extracted as the search condition items in the search condition item extraction step,
the material property relationship graph is searched for a path not passing through the third node among paths from the start point to the end point in the graph search step;
when a third search mode is extracted as the search mode and a start point, an end point and a path length condition are extracted as the search condition items in the search condition item extraction step,
the material property relationship graph is searched for a path satisfying the path length condition among paths from the start point to the end point in the graph search step;
when a fourth search mode is extracted as the search mode and a start point, an end point and a third node are extracted as the search condition items in the search condition item extraction step,
the graph search step includes
a first search step of searching the material property relationship graph for a path from the start point to the end point,
a second search step of searching the material property relationship graph for a path from the start point to the third node, and
at least one of a first common path generation step of finding a path common to the path searched for in the first search step and the path searched for in the second search step, a first uncommon path generation step of finding a path uncommon to these paths, and a first sum subgraph generation step of generating a subgraph by a sum of a first subgraph composed of a plurality of paths from the start point to the end point and a second subgraph composed of a plurality of paths from the start point to the third node,
when a fifth search mode is extracted as the search mode and a start point, an end point and a third node are extracted as the search condition items in the search condition item extraction step,
in the graph search step, at least one of the following first to ninth search modes is executable:
a first search step of searching the material property relationship graph for a path from the start point to the end point,
a third search step of searching the material property relationship graph for a path from the third node to the end point, and
at least one of a second common path generation step of finding a path common to the path searched for in the first search step and the path searched for in the third search step, a second uncommon path generation step of finding a path uncommon to these paths, and a second sum subgraph generation step of generating a subgraph by a sum of a first subgraph composed of a plurality of paths from the start point to the end point and a third subgraph composed of a plurality of paths from the third node to the end point,
when a sixth search mode is extracted as the search mode and a start point, an end point and a third node are extracted as the search condition items in the search condition item extraction step,
the material property relationship graph is searched for a path from the end point to the third node in addition to a path from the start point to the end point in the graph search step;
when a seventh search mode is extracted as the search mode and a start point, an end point and a path length condition are extracted as the search condition items in the search condition item extraction step,
the material property relationship graph is searched for a path satisfying the path length condition from the end point in addition to a path from the start point to the end point in the graph search step;
when an eighth search mode is extracted as the search mode and a start point and a path length condition are extracted as the search condition items in the search condition item extraction step,
the material property relationship graph is searched for a path satisfying the path length condition from the start point in the graph search step;
when a ninth search mode is extracted as the search mode and an end point and a path length condition are extracted as the search condition items in the search condition item extraction step,
the material property relationship graph is searched for a path starting from a node within a range satisfying the path length condition among paths to the end point in the graph search step,
and the result is output as a search result.

10. The search method according to claim 8, further comprising a search result output step, wherein:
in the search condition extraction step, a display option is further extracted based on the input search condition;
when a first search mode is extracted as the search mode and a start point, an end point and a third node are extracted as the search condition items in the search condition item extraction step,
the material property relationship graph is searched for a path passing through the third node among paths from the start point to the end point in the graph search step;
when a second search mode is extracted as the search mode and a start point, an end point and a third node are extracted as the search condition items in the search condition item extraction step,
the material property relationship graph is searched for a path not passing through the third node among paths from the start point to the end point in the graph search step;
when a third search mode is extracted as the search mode and a start point, an end point and a path length condition are extracted as the search condition items in the search condition item extraction step, the material property relationship graph is searched for a path satisfying the path length condition among paths from the start point to the end point in the graph search step;

is capable of executing at least one of the first to third search modes; and in the search result output step, a path matching the display option as a result of the graph search step is output as a search result from among a plurality of extracted paths.

11. The search method according to claim 10, wherein:

the display option includes at least one of a first to a sixth options;

when the display option is the first option, all the paths extracted in the graph search step are output as search results in the search result output step, when the display option is the second option, a path having the shortest path length among the paths extracted in the graph search step is output as a search result in the search result output step, when the display option is the third option, a path having a path length shorter than or equal to a first predetermined value among the paths extracted in the graph search step is output as a search result in the search result output step, when the display option is a fourth option, the search result output unit outputs a path having a path length equal to or longer than a second predetermined value and shorter than or equal to a third predetermined value among the paths output from the graph searcher as a search result;

when the display option is a fifth option, the search result output unit outputs a path having a path length equal to or longer than a fourth predetermined value among the paths output from the graph searcher as a search result; and when the display option is a sixth option, a difference between a path extracted in the graph search step and a path that should be displayed when any of the specified first to fifth options is made to act on the same search is output as a search result in the search result output step.

12. The search method according to claim 8, further comprising a search result output step, wherein:

in the search condition extraction step, a display option is further extracted based on the input search condition;

when the display option is a predetermined first option, the graph search step includes a first search step in which, when a start point and an end point are specified, the path from the start point to the end point is searched and the search result is output as the first search result, and a second search step in which a path from another start point that is different from the above start point to another end point that is different from the above end point, and is a path connecting the another start point and the another end point so as to include the largest number of nodes on the path included in the search result of the first graph search step is output as the second search result; and in the search result output step, the second search result is output in addition to the first search result.

13. The search method according to claim 8, further comprising a search result output step, wherein:

in the search condition extraction step, a display option is further extracted based on the input search condition;

when the display option is a predetermined second option, in the graph search step, when a start point or an end point and a path length condition are specified, a subgraph by a node within the range satisfying the path length condition from the start point or a subgraph starting from a node within the range satisfying the path length condition among the paths to the end point is generated as a first subgraph, and a first subgraph generation step in which another subgraph having the highest similarity to the first subgraph is generated; and in the search result output step, the another subgraph is output in addition to the first subgraph.

14. The search method according to claim 8, further comprising a database and a graph generation step, wherein:

in the graph generation step, the material property relationship graph is generated from a database composed of a plurality of parameter pairs of material property parameters having mutual relationships and is expanded on the memory.

* * * * *